(No Model.) 3 Sheets—Sheet 1.

G. W. PACKER.
COMBINED CORN HUSKER AND FODDER SHREDDER.

No. 546,550. Patented Sept. 17, 1895.

WITNESSES,
Howard D. Orr,
H. S. Shepard

INVENTOR,
George W. Packer
By John G. Manahan.
his Atty.

ANDREW B.GRAHAM, PHOTO-LITHO, WASHINGTON, D.C.

(No Model.) 3 Sheets—Sheet 2.
G. W. PACKER.
COMBINED CORN HUSKER AND FODDER SHREDDER.
No. 546,550. Patented Sept. 17, 1895.
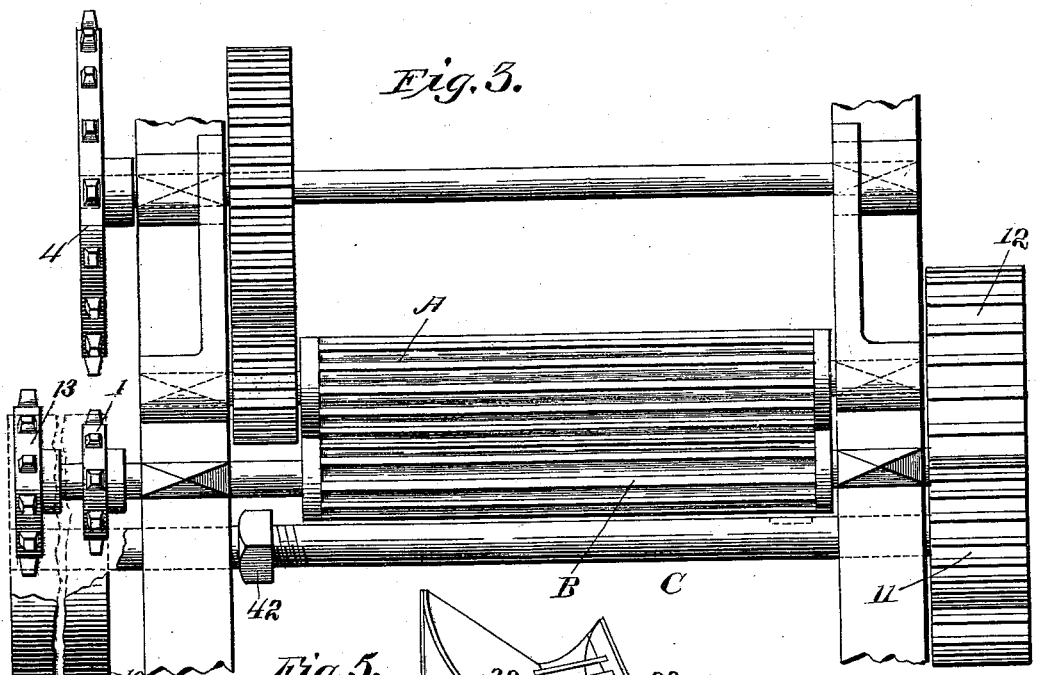
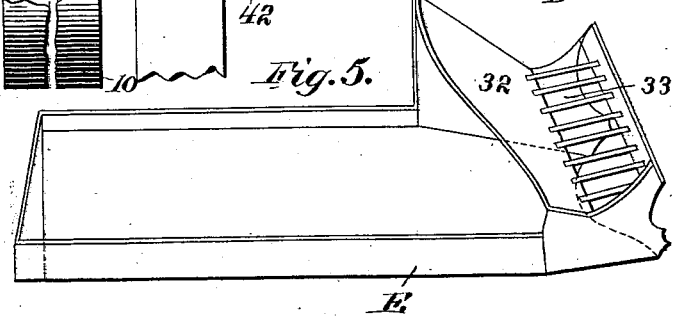
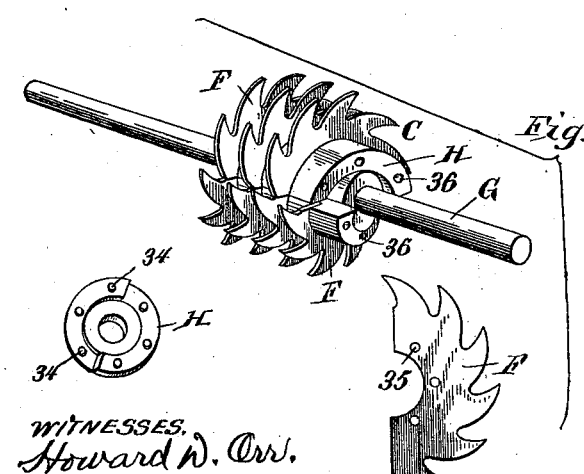
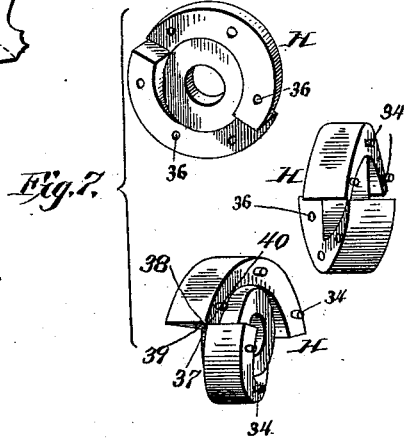
WITNESSES.
Howard W. Orr.
H. S. Shepard.
INVENTOR
George W. Packer,
BY
John G. Manahan,
HIS ATT'Y.

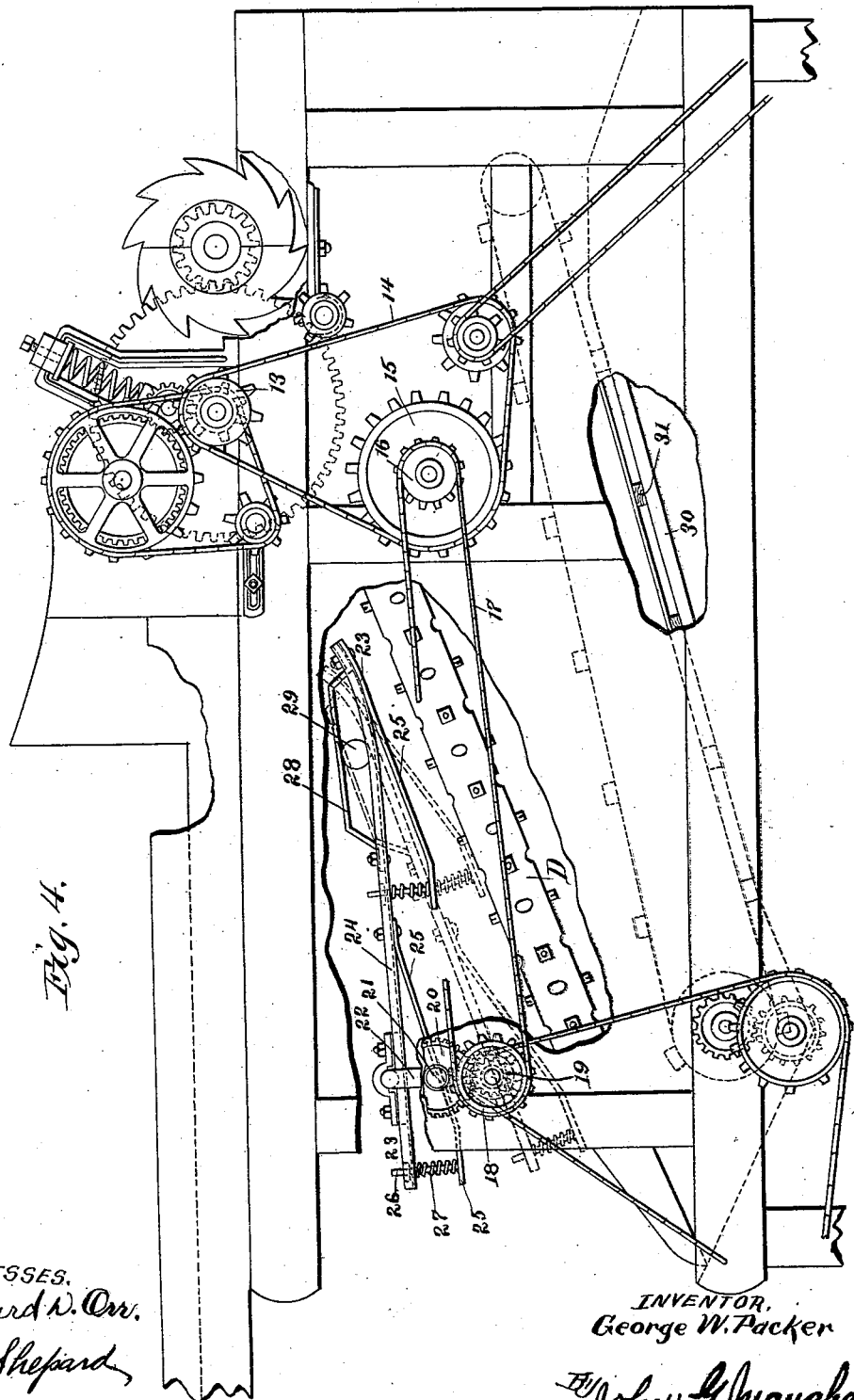

UNITED STATES PATENT OFFICE.

GEORGE W. PACKER, OF ROCK FALLS, ASSIGNOR TO THE KEYSTONE MANUFACTURING COMPANY, OF STERLING, ILLINOIS.

COMBINED CORN-HUSKER AND FODDER-SHREDDER.

SPECIFICATION forming part of Letters Patent No. 546,550, dated September 17, 1895.

Application filed April 22, 1895. Serial No. 546,696. (No model.)

*To all whom it may concern:*

Be it known that I, GEORGE W. PACKER, a citizen of the United States, residing at Rock Falls, in the county of Whiteside and State of Illinois, have invented certain new and useful Improvements in a Combined Corn-Husker and Fodder-Shredder; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to combined corn-huskers and fodder-shredders, and comprises certain improvements upon the machine for which, on March 28, 1893, I was granted United States Letters Patent No. 494,511, for corn huskers and shredders.

My present invention relates to different departments of the aforesaid combined machine, one of my present improvements being mechanism for uniformly feeding the unhusked ears to the husking-roller; another part consists in a novel conformation of the snapping-rollers, a third improvement being in the mode of driving and securing the automatic adjustment of the snapping-rollers; fourth, an improved construction, conformation, and operation of the shredding-cylinder.

As the general construction and interrelation of the several operative parts constituting the machine to which my present invention relates can be readily understood from the inspection of the aforesaid patents, I do not deem it necessary to show or describe the entire machine or any more thereof than is requisite to a clear understanding of the position, construction, and operation of those parts involved in my present invention.

The aforesaid improvements are illustrated in the accompanying drawings, in which—

Figure 1:
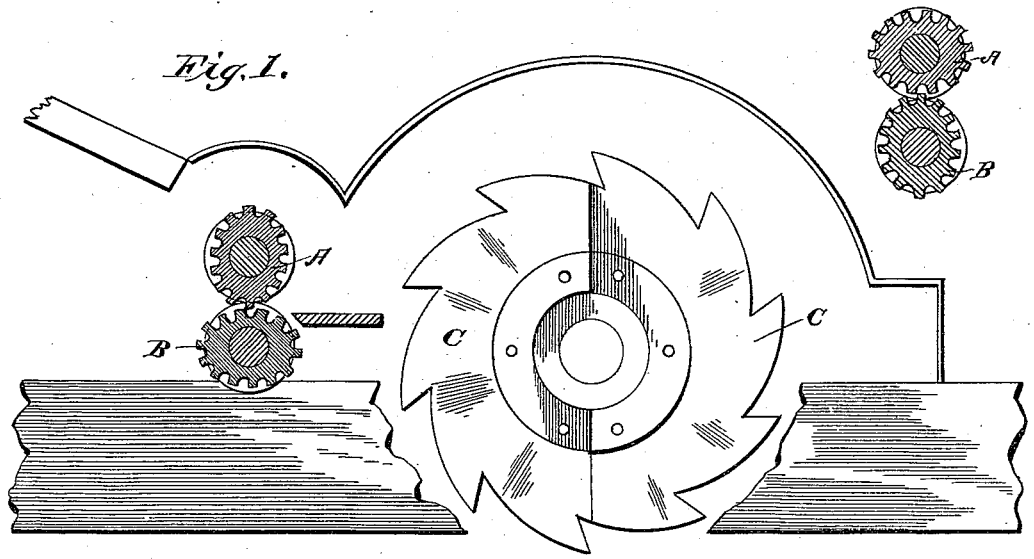
Figure 2:
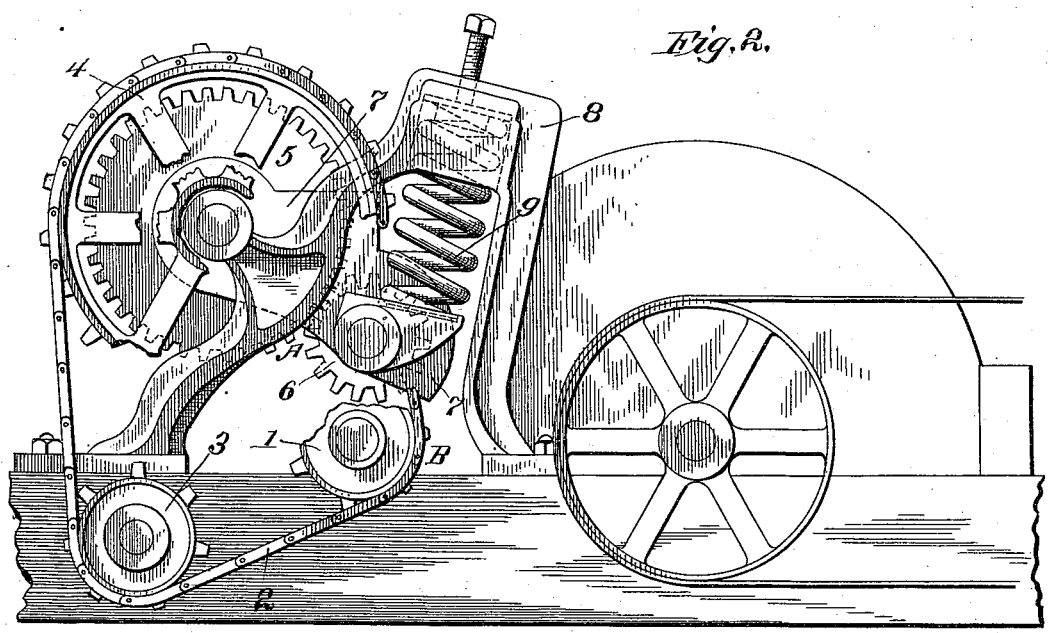

Figure 1 is a vertical cross-section of the snapping-rollers and the shredding-cylinder in their mutual relation, such cross-section being lengthwise of the machine. Fig. 2 is an end view of the mechanism for rotating the snapping-rollers and permitting their mutual adjustability. Fig. 3 is a view of the snapping-rollers from the rear. Fig. 4 is a view of the mechanism for regulating the feed of the unhusked ears to the husking-rollers and of the husk-ejector. Fig. 5 is a view of the feed-hood. Fig. 6 is details of the shredding-cylinder. Fig. 7 is details of the collars interposed between the shredder-blades.

Similar letters and numerals refer to similar parts throughout the several views.

Referring to Fig. 1, A is the upper snapping-roller and B the lower one. These rollers feed the fodder to the shredding-cylinder C and also snap the ear from the stock, permitting such ear to drop to the husking-rollers.

One difficulty heretofore met in the operation of the snapping-rollers was to set them with a proper interval for the varying conditions of the fodder. The spring which holds the upper roller A down toward roller B is too strong to be raised by very brittle dry fodder when the interval between said rollers is the proper one for damp fodder. The result then is that stalks are often snapped at the joints instead of being fed through; also, part of the stalk is often broken off and dropped down with the ear, preventing the latter from being engaged properly by the husking-rollers. To change the mutual relation of said rollers usually requires several hours, as the machine must be virtually taken apart. My improvement in this behalf consists of constructing said rollers in oblong form in cross-section, and by simply taking off the drive-chain and giving either roller a quarter rotation and replacing the chain the rollers can be operated in a changed mutual relation. In Fig. 1 the upper pair of rollers A B shown with the long diameter of one rotating oppositely the short diameter of the other, and the lower pair A B are shown with their shorter and longer diameters rotating oppositely, respectively.

Referring to Fig. 2, a sprocket-wheel 1, seated on the shaft of the lower roller B and driven from the opposite end of said shaft, as hereinafter described, by means of a sprocket-chain 2, passing over idler 3 and around a sprocket-gear 4, imparts rotation to the latter. On the shaft of the sprocket-gear 4 there is seated the gear 5, which engages the pinion 6, seated rigidly on the shaft of the upper snapping-roller A. The sprocket 1 on the roller B bears the same proportion to sprocket 4 that the pinion 6 on roller A bears to gear 5, so that the rotation of rollers A and B is always uniform, and any change in the relative position of their peripheries, as shown in Fig. 1, is retained until altered. The upper roller A is seated in the outer end of a yoke 7, whose opposite end is pivoted on the bracket 8 in line with the axis of wheel 5. A coiled spring 9, adjustably seated between the upper end of bracket 8 and the upper surface of yoke 7, holds the roller A adjustably down to its work. Any unusual amount of feed, or other occasion for lifting the roller A against spring 9, is permitted by the outer end of yoke 7 rising, but as its engaging-surface travels concentrically with the periphery of gear 5 it remains at all times in engagement with the latter.

Referring to Fig. 3, the pulley 10 on the shaft of the shredding-cylinder C receives the motive power to actuate the entire machine. On the opposite end of said shredder-shaft there is keyed the gear 11, which engages and actuates the gear 12 on the shaft of snapping-roller B. A sprocket-wheel 13 on the shaft of the roller B, outside of sprocket 1, drives a chain 14, Fig. 4, which, among other things, drives a sprocket-wheel 15, suitably seated below the sprocket 13. On the shaft of the sprocket 15 there is keyed a smaller sprocket 16, from which a chain 17 extends to a sprocket 18, seated just above the lower end of the husking-rollers D. Within sprocket 18 and upon its shaft is seated the gear 19, which engages and drives a gear 20 above it and keyed upon shaft 21. The latter shaft is provided with cranks 22, one pair to each pair of husking-rollers, upon which are seated the feed-regulators 23. Each of the latter consists of an upper surface 24 and two lower partially-curved surfaces 25. The front ends of the parts 25 are connected directly to the parts 24, and their rear ends adjustably held in proper relation thereto by bolt 26 and interposed spring 27. On the upper surface of 24 there is formed a yoke 28, which rests upon a stud 29 and supports the front end of the regulator 23, but permits longitudinal movement thereof, occasioned by the rotation of the crank 22.

The operation of the regulator 23 is as follows: The front end thereof in the rotation of said crank-shaft moves down the upper surface of the husking-rollers over the interval between the latter and has the effect of gently forcing the ears into said interval and into engagement with said rollers. The oblique surfaces 25 have the same effect on ears erect or out of proper position on said rollers, and tend to push such ears over into suitable position and also exert a yielding pressure on ears in proper position.

Heretofore trouble has been experienced in getting rid of the corn husks and silks carried down between husking-rollers. Another one of my improvements consists in an incline platform 30, placed under the husking-rollers and extending to the rear of the machine sufficiently to discharge its imposed material into the chopped-fodder elevator at the rear of the machine. A suitably driven series of cross-slats 31 are continuously driven up the platform 30 and force the husks and silk, which drop through between said slats to said platform, up said platform and discharge the same over the rear of the latter upon the chopped-fodder elevator, where they are carried and deposited with the chopped fodder.

Referring to Fig. 5, E is a frame adapted to be set in front of the snapping-rollers and provided with an obliquely-formed hood 32 and permanently-open visual intervals 33 therein near the snapping roller for the ready supervision of the operation of the latter. The long side of the hood 32 is that at which the operator stands to feed the fodder to the snapping-rollers, and the purpose of the obliquity of said hood is to protect the operator from accidental contact with the snapping-rollers and at the same time provide sufficient room at the opposite side of the table for the throwing in of the fodder.

Referring to Fig. 6, one view therein presents the shredder C complete and the other the same partially put together. The shredder C consists of a spirally-arranged shredding-blade F set perpendicular or at right angles to the shaft G of said shredder. For convenience in placing the blade F spirally around the shaft G and at the same time perpendicular to the latter, I form the blade F in segments and interpose the peculiarly-formed collars H between the winds or coils of said shredder-blade, one half of a collar being in one wind and the other half in another. Each of the collars comprises a cylindrical hub and two segmental spiral rims, each of the rims being of the same thickness as the length of the hub, and the pitch of the spiral being such that one side of each end of one of the rims will be substantially even with the opposite side of the adjacent ends of the other rim. In this manner the ends of the rims of the adjacent collars will abut against each other and prevent either one of the collars from turning upon the shaft without all of the other collars being turned with it, and it will also cause the blades of the shredder to be clamped tightly between the flanges of the collars, with each end abutting against one of the shoulders formed by the ends of the rims, which will add great strength to the shredder, as the strain upon the blades is taken up by the shoulders instead of by the bolts which secure them together. Pins 34 in one of the collars H extend through openings 35 in each segment of the spiral F into opening 36 in the opposite collar H. The extremity of the forward end of one of the segmental blades lies against one side 37 of one half of the collar H, while the rear end of the next succeeding segmental blade lies against the opposite side of the other half of said collar H, the angles 39 and 40 of said collar being in lines of prolongation of each other. When the parts are all in position, they are compressed between a fixed collar 41 on shaft G at one end of the shredder C and a nut 42 screwed on said shaft at the other end of said shredder. The advantage of this form of shredder is that the spirally-arranged shredder-blades tend to carry stalks projected perpendicularly to the shaft of the shredder up or along the spiral, and thus present said stalks laterally to the tearing action of the peripheral points on said spiral. In other words it is impracticable for the end of a stalk to stay between the spirals more than an instant. The advantage of setting the spiral blade F perpendicular to the periphery of the shaft G is that thereby the ends of stalks proceeding from rollers A and B invariably come in contact with the edge of said spiral and not with its sides.

In the formation shown there is used what is termed a "double spiral," but the result would be the same, only in a different degree, in the use of a single or quadruple spiral.

What I claim as my invention, and desire to secure by Letters Patent of the United States, is—

1. In a fodder shredder, the combination, with the shaft D, of collars H thereon, each of said collars comprising a cylindrical hub and two transversely perforated cylindrical spiral rims, each rim being of substantially the same thickness as the length of the hub, and the pitch of the spiral being such that one side of each end of one of the spirals will be substantially even with the opposite side of the adjacent end of the other spiral, shredding blades between the rims of the different collars, and pins through the blades and into the rims, substantially as set forth.

2. In a fodder shredder, the combination, of a shaft G, shredder blades F arranged spirally upon said shaft, and collars H, consisting of a tubular center adapted to be seated on said shaft, and segmental blade rests, formed obliquely in opposite directions on the periphery of said tubular center, and adapted to receive the aforesaid blades, substantially as set forth.

3. In a fodder shredder, the combination, with a frame, of a bracket secured thereto, the upper portion of which is provided with a set screw, a shaft journaled in one leg of the bracket, a sprocket wheel, a gear wheel, and a yoke upon the shaft, a roller journaled in the free end of the yoke, a second roller journaled in the frame adjacent the first mentioned roller, one end of which is provided with a sprocket wheel, an idle wheel, a sprocket chain over the two sprocket wheels and the idle wheel, and a spring between the free end of the yoke and the upper end of the bracket, substantially as set forth.

4. In a corn husking machine, the snapping rollers, A, B, formed oblong in cross-section and provided with fluted and ridged sides adapted to mutually engage, substantially as set forth.

5. In combination with husking rollers D, regulators 23 provided with sloping bases 25 and suspended over the interval between said rollers and adapted to have a longitudinal, orbital movement in the line of said roller, substantially as shown and for the purpose described.

In testimony whereof I affix my signature in presence of two witnesses.

GEORGE W. PACKER.

Witnesses:
ISABELLE MANAHAN,
CHATTIE L. MANAHAN.